US00RE49067E

(19) United States
(12) Reissued Patent
McCullough et al.

(10) Patent Number: US RE49,067 E
(45) Date of Reissued Patent: May 10, 2022

(54) FLIGHT DECK MULTIFUNCTION CONTROL DISPLAY UNIT

(71) Applicant: HONEYWELL INTERNATIONAL INC., Morris Plains, NJ (US)

(72) Inventors: Sue McCullough, Phoenix, AZ (US); Mark Pearson, Peoria, AZ (US); Phillip Toews, Phoenix, AZ (US); Charles Dairman, Buckeye, AZ (US); Shane Lai, Scottsdale, AZ (US); Hariharan Saptharishi, Tamilnadu (IN); Venkat Ramana Mummadi, Karnataka (IN)

(73) Assignee: HONEYWELL INTERNATIONAL INC., Charlotte, NC (US)

(21) Appl. No.: 16/425,179

(22) Filed: May 29, 2019

Related U.S. Patent Documents

Reissue of:
(64) Patent No.: 9,665,345
Issued: May 30, 2017
Appl. No.: 14/552,757
Filed: Nov. 25, 2014

U.S. Applications:
(60) Provisional application No. 62/030,489, filed on Jul. 29, 2014.

(51) Int. Cl.
*G10L 15/00* (2013.01)
*G06F 3/16* (2006.01)
(Continued)

(52) U.S. Cl.
CPC ..... *G06F 3/167* (2013.01); *B64D 43/00* (2013.01); *G06F 3/017* (2013.01); *G06F 3/0416* (2013.01); *G10L 15/22* (2013.01); *G10L 15/26* (2013.01)

(58) Field of Classification Search
CPC ..... G06F 3/167; G06F 3/017; G06F 3/0416; B64D 43/00; G10D 15/22; G10D 15/26
See application file for complete search history.

(56) References Cited

U.S. PATENT DOCUMENTS 7,418,319 B2 8/2008 Chen et al.
7,580,377 B2 * 8/2009 Judd ..... G08G 5/0013 370/277
(Continued)

FOREIGN PATENT DOCUMENTS

CA 2831509 1/2014
CA 2831509 A1 1/2014
(Continued)

OTHER PUBLICATIONS

Ballard Technologies "USB 429 ARINC 429/717 Interface Technical Data Sheet", 2010. (Year: 2010).*
(Continued)

*Primary Examiner* — Luke S Wassum
(74) *Attorney, Agent, or Firm* — Lorenz & Kopf, LLP

(57) ABSTRACT

Systems and methods for controlling a flight deck multifunction control display unit are disclosed. In various embodiments, the systems may comprise a flight management system or other MCDU driven devices, a command database that stores a plurality of voice commands and a plurality of multifunction control display unit commands. In various embodiments, each voice command is associated with one of the plurality of multifunction control display unit commands. The systems may further comprise a pilot voice interface configured to receive a voice command from a pilot and transmit the voice command to the multifunction control display unit. The multifunction control display unit can receive the voice command from the pilot voice interface and, in response, access the command database to identify a multifunction control display unit command in the command database that is associated with the voice command.

8 Claims, 10 Drawing Sheets

(51) Int. Cl.

| | |
|---|---|
| ***G06F 3/01*** | (2006.01) |
| ***G10L 15/22*** | (2006.01) |
| ***G06F 3/041*** | (2006.01) |
| ***G10L 15/26*** | (2006.01) |
| ***B64D 43/00*** | (2006.01) |

(56) References Cited

U.S. PATENT DOCUMENTS

| | | | | |
|---|---|---|---|---|
| 8,159,464 | B1 * | 4/2012 | Gribble | G06F 3/038 345/173 |
| 8,364,328 | B2 | 1/2013 | Hedrick | |
| 9,132,913 | B1 * | 9/2015 | Shapiro | B64C 19/00 |
| 9,377,852 | B1 * | 6/2016 | Shapiro | G06F 3/013 |
| 9,530,318 | B1 * | 12/2016 | Turner | B64D 43/00 |
| 9,534,922 | B1 * | 1/2017 | McCusker | G01C 23/005 |
| 9,830,910 | B1 * | 11/2017 | Shapiro | G08G 5/0013 |
| 9,922,651 | B1 * | 3/2018 | Nelson | G10L 15/26 |
| 2002/0082844 | A1 * | 6/2002 | Van Gestel | G06F 3/16 704/275 |
| 2007/0189328 | A1 | 8/2007 | Judd | G10L 15/26 370/466 |
| 2008/0221886 | A1 * | 9/2008 | Colin | G08G 5/0013 704/246 |
| 2009/0093953 | A1 * | 4/2009 | Wiesemann | G01C 23/005 701/532 |
| 2010/0152924 | A1 * | 6/2010 | Pandit | G01C 23/00 701/3 |
| 2010/0305786 | A1 * | 12/2010 | Boorman | G08G 5/025 701/16 |
| 2011/0101058 | A1 | 5/2011 | Heckman | |
| 2011/0125503 | A1 * | 5/2011 | Dong | G10L 15/22 704/275 |
| 2011/0264313 | A1 * | 10/2011 | Sampath | G08G 5/0013 701/16 |
| 2012/0022778 | A1 * | 1/2012 | Mishra | G08G 5/003 701/454 |
| 2012/0299839 | A1 | 11/2012 | Lu | |
| 2012/0310450 | A1 * | 12/2012 | Srivastav | G08G 5/0021 701/3 |
| 2012/0316766 | A1 * | 12/2012 | Lafon | G01C 21/34 701/120 |
| 2013/0124034 | A1 * | 5/2013 | Lentz | B64F 5/60 701/31.4 |
| 2013/0187869 | A1 * | 7/2013 | Rydenhag | G06F 3/04883 345/173 |
| 2013/0204469 | A1 * | 8/2013 | Horsager | B64D 45/00 701/3 |
| 2013/0346081 | A1 * | 12/2013 | Loubiere | G08G 5/0013 704/260 |
| 2014/0107871 | A1 | 4/2014 | Williams et al. | |
| 2014/0214246 | A1 * | 7/2014 | Johnson | B64D 45/00 701/15 |
| 2014/0222254 | A1 * | 8/2014 | Ribich | F16M 13/022 701/3 |
| 2014/0274217 | A1 * | 9/2014 | Lee | H04B 1/3888 455/566 |
| 2015/0016777 | A1 * | 1/2015 | Abovitz | G06F 3/0482 385/37 |
| 2015/0123912 | A1 * | 5/2015 | Nikolic | G06F 3/0482 701/7 |
| 2016/0179327 | A1 * | 6/2016 | Zammit-Mangion | G06F 3/0482 701/7 |
| 2017/0251501 | A1 * | 8/2017 | Batsakes | B64D 43/00 |

FOREIGN PATENT DOCUMENTS

| | | | |
|---|---|---|---|
| CN | 202694151 | U | 1/2013 |
| EP | 2337024 | A1 | 6/2011 |

OTHER PUBLICATIONS

Mertens, M., H.J. Damveld, and C. Borst "An Avionics Touch Screen-Based Control Display Concept", Proceedings of SPIE 8383, 83830L, May 21, 2012. (Year: 2012).*

Alepetite, A., D. Zammit-Mangion, M. Fabbri, R. Fogh, C. Zammit, and I. Agius "Direct Tactile Manipulation of the Flight Plan in a Modern Aircraft Cockpit", Proceedings of the ACM International Conference on Human-Computer Interaction in Aerospace (HCI-Aero 2012), Sep. 12-14, 2012. (Year: 2012).*

One Display for a Cockpit Interactive Solution (ODICIS) Consortium "Project Final Report", Oct. 17, 2012. (Year: 2012).*

Clark, N. "Touch Screens Are Tested for Piloting Passenger Jets", New York Times, Jul. 5, 2013. (Year: 2013).*

Jedruscek, M., J. Gauci, A. Muscat, and D. Zammit-Mangion "A new HMI for Aircraft Guidance using Touch Technologies", Proceedings of the 31st EAAP Conference, Sep. 2014. (Year: 2014).*

"First Office Action" EP 15 176 862, Nov. 30, 2015. (Year: 2015).*

"Second Office Action", EP 15 176 862, dated Jan. 31, 2018. (Year: 2018).*

"First Office Action", CN 2015 10571254, dated Oct. 24, 2018. (Year: 2018).*

"Third Office Action", EP 15 176 862, dated Nov. 15, 2018. (Year: 2018).*

"Response to Third Office Action", EP 15 176 862, dated Jun. 26, 2019. (Year: 2019).*

"Fourth Office Action", EP 15 176 862, dated Jul. 19, 2019. (Year: 2019).*

MCDU Image dated Aug. 21, 2014, retrieved from https://www.google.com/search?q=ipadmcdu&safe=active&rlz=1C1CHFX_enUS549US549&espv=2&source=lnms&tbm=isch&sa=X&ei=xe9PVKKuGuX58AHz2YGABQ&ved=0CAYQ_AUoAQ&biw=1280&bih=909.

Moore C.A., et al.; Use of Voice Integrated With Aircraft Cockpit Displays, SID International Symposium, Jun. 5-7, 1984, San Francisco.

http://www.ballardtech.com/products.aspx/USB429/, retrieved Sep. 10, 2011.*

EP Extended Search Report for Application No. 15176862.9-1910 dated Nov. 30, 2015.

Aviation Platform; New Cockpit—Goodie: The Tablet; [Retrieved from Internet Jul. 22, 2014] [www.aviationplatform.com/index/php/tech-a-developments].

Flight Focus; Enhanced Electronic Flight Bag, Optimizing Flight Operations with Connectivity; [Retrieved from Internet Jul. 22, 2014] [www.flightfocus.net].

MCDU image dated Aug. 21, 2014, retrieved from https://www.google.com/search?q=ipadmcdu&safe=active&rlz=1C1CHFX_enUS549US549&espv=2&source=nms&tbm=isch&sa=X&ei=xe9PVKKuGuX58AHz2YGABQ&ved=0CAYQ_AUoAQ&biw=1280&bih=909.

* cited by examiner

800

802 804

| MCDU CMD | VOICE CMD |
|---|---|
| #5CLR SPAD | "CLEAR SPAD" |
| #6RETURN | "BACK" |
| #6RETURN | "RETURN" |
| #1HGGRD | "HAGGARD" |
| #1PXR | "PHOENIX" |
| #1KPHX | "PHOENIX TOWER" |
| #1PHX | "PHOENIX VOR" |
| #1BLH | "BLYTHE" |
| #1BZA | "BARD" |
| #1SALOM | "SALOME" |
| #1SALOM | "SOLOM" |
| #1HYDRR | "HYDER" |
| #1ARLIN | "ARLINE" |
| #1BXK | "BUCKEYE" |
| #1TUKEE | "TUKEY" |
| #1IWA | "WILLIE" |
| #1GBN | "GILA BEND" |
| #1SADLL | "SADDLE" |
| #1PAYNT | "PAINT" |
| #1GUP | "TYPE GALLUP" |
| #1GUP | "GALLUP" |
| #1EAGUL | "ENTER EAGLE" |
| #1HOMRR | "HOME OR" |
| #1RVJ | "PRISON" |
| #1UQN | "ONION" |
| #1SAV | "SAVANNAH" |

FIG. 8A

800

802 804 806A 806B 806C

| MCDU CMD | VOICE CMD |
|---|---|
| #1129.25 | "FREQUENCY ONE TWENTY NINE POINT TWO FIVE" |
| #1129.25 | "FREQUENCY ONE HUNDRED TWENTY NINE POINT TWO FIVE" |
| #1129.25 | "DWF TOWER FREQUENCY " |
| #2ADS | "ADS" |
| #2ATC INDEX | "ATC INDEX" |
| #2ATC LOG | "ATC LOG" |
| #2ATC LOGON | "ATC LOGON" |
| #2ATC LOGON | "LOGON" |
| #2ATC POS REPORT | "ATC POS REPORT" |
| #2ARRIVAL | "ARRIVAL" |
| #2CLIMB | "CLIMB" |
| #2CRUISE | "CRUISE" |
| #2DEPARTURE | "DEPARTURE" |
| #2DESCENT | "DESCENT" |
| #2FIX INFO | "FIX INFO" |
| #2NAV INDEX | "NAV INDEX" |
| #2PATTERNS | "PATTERNS" |
| #2PREDICTIONS | "PREDICTIONS" |
| #2PERF INIT | "PERF INIT" |
| #2PERF INIT | "PURF INIT" |
| #2SECONDARY INDEX | "SECONDARY INDEX" |
| #2TEMP COMP | "TEMP COMP" |
| #2WIND TEMP | "WIND TEMP" |
| #2CRUISE ALTITUDE | "CRUISE ALTITUDE" |
| #2CRUISE ALTITUDE | "CRUISE ALT" |
| #2WEIGHTS | "WEIGHTS" |
| #2PATTERNS | "PATTERNS" |
| #2FLIGHT SUMMARY | "FLIGHT SUMMARY" |
| #2SECONDARY INDEX | "SECONDARY INDEX" |
| #3ATC | "ATC" |
| #3ARR RUNWAY | "ARRIVAL RUNWAY" |
| #3APPROACH | "APPROACH" |
| #3STAR | "STAR" |
| #3DEP RUNWAY | "DEPARTURE RUNWAY" |
| #3SID | "SID" |

FIG. 8B

800

802 804

| MCDU CMD | VOICE CMD |
|---|---|
| #3SEC FPLN | "SECONDARY FLIGHT PLAN" |
| #3SEC DEP | "SECONDARY DEPARTURE" |
| #3SEC ARR | "SECONDARY ARRIVAL" |
| #3SEC PATTERNS | "SECONDARY PATTERNS" |
| #3SEC PERF INIT | "SECONDARY PERF INIT" |
| #3SEC CLIMB | "SECONDARY CLIMB" |
| #3SEC CRUISE | "SECONDARY CRUISE" |
| #3SEC DESCENT | "SECONDARY DESCENT" |
| #3SEC PERF DATA | "SECONDARY PERF DATA" |
| #3SEC PERF PLAN | "SECONDARY PERF PLAN" |
| #4PERF | "PERF" |
| #4PERF | "PURF" |
| #4NAV | "NAV" |
| #4PREV | "PREVIOUS" |
| #4FPL | "FLIGHT PLAN" |
| #4DIR | "DIR TO" |
| #4DIR | "DIRECT TO" |
| #4PROG | "PROGRESS" |
| #4MENU | "MENU" |
| #4DLK | "CMF DATALINK" |
| #4DLK | "DLK" |
| #4NEXT | "NEXT" |
| #4RADIO | "RADIO" |
| #2DISTANCE TO GO | "DISTANCE TO GO" |
| #2AIRCRAFT HEADING | "AIRCRAFT HEADING" |
| #2CROSS TRACK ERROR | "CROSS TRACK ERROR" |
| #7ORIGIN-KPHX | "ENTER ORIGIN PHOENIX" |
| #7ORIGIN-KDVT | "ENTER ORIGIN DEER VALLEY" |
| #7ACTIVATE | "ACTIVATE FLIGHT PLAN" |
| #7CYCLE NAV D B | "CYCLE NAV DATA BASE" |
| #7CRUISE ALTITUDE-10000 | "ENTER CRUISE ALTITUDE TEN THOUSAND" |
| #7DEST-KPHX | "ENTER DESTINATION PHOENIX" |
| #7DEST-KDVT | "ENTER DESTINATION DEER VALLEY" |

FIG. 8C

FLIGHT DECK MULTIFUNCTION CONTROL DISPLAY UNIT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a non-provisional of and claims priority to and the benefit of U.S. Provisional Application No. 62/030,489, filed Jul. 29, 2014, and entitled, FLIGHT DECK CONTROL AND DISPLAY, which is hereby incorporated by reference in its entirety.

TECHNICAL FIELD

The present invention generally relates to flight management systems, and more particularly, to a flight deck multifunction control display unit.

BACKGROUND

A flight management system (or "FMS") is a computer system that operates aboard an aircraft. Flight management systems may receive a variety of avionics data and may, based upon the received data, automate a wide variety of in-flight tasks (e.g., navigation tasks).

Often times, flight management (and other) systems are accessed and controlled through one or more multifunction control display units (or "MCDUs"). Conventional MCDUs may include a low resolution display (e.g., a low resolution LCD display) and a keypad. Conventional MCDUs often comprise a large hardware bundle packaged within an MCDU cabinet. Thus, conventional MCDUs can be quite heavy, and any changes to MCDU functionality frequently require hardware redesign and/or hardware reconfiguration.

During operation, a pilot or copilot may manipulate the physical keys comprising the MCDU keypad to navigate to a particular FMS feature or function, such as, for example, an airport identification code, a radio frequency, a flight plan, and the like. Thus, to reach an FMS feature or function, it may be necessary that a pilot utilize the keypad to navigate through a set of menus and/or submenus using the keypad. Therefore, to reach a desired feature or function, a pilot may be required to recall and execute a number of button presses and/or other manual operations using the keypad. This process may consume time and focus, particularly where the pilot is unfamiliar with the feature and/or function being sought. The difficulty associated with locating the desired feature or function may be magnified during circumstances (e.g., landing) that may give rise to a high or fluctuating workload. Moreover, low resolution MCDU displays may fail to support a variety of non-English characters, rendering many existing MCDU displays unusable to pilots who are not trained to use English MCDU displays.

Hence, there is a need for a more pilot-friendly MCDU, such as for example, a tablet (e.g., a tablet computing device) MCDU. There is further a need for an MCDU having a touchscreen interface, as well as an MCDU that can be reconfigured on the fly, without hardware redesign, as well as an MCDU that supports a variety of non-standard (e.g., non-ASCII characters. A need further exists for an MCDU that reduces pilot workload, such as an MCDU that accepts voice commands, rather than and/or in addition to, as described above, manual command entries. A need further exists for an MCDU that includes wireless communication capability, one or more proximity sensors, one or more accelerometers, and the like.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Systems and methods for controlling a flight deck multifunction control display unit are disclosed. In various embodiments, the systems may comprise a flight management system, a command database that stores a plurality of voice commands and a plurality of multifunction control display unit commands. In various embodiments, each voice command is associated with one of the plurality of multifunction control display unit commands. The systems may further comprise a pilot voice interface configured to receive a voice command from a pilot and transmit the voice command to the multifunction control display unit. The multifunction control display unit can receive the voice command from the pilot voice interface and, in response, access the command database to identify a multifunction control display unit command in the command database that is associated with the voice command, and transmit the multifunction control display unit command to the flight management system or other MCDU driven avionics system (or "FMS/AS") for execution thereby.

Likewise, in various embodiments, the methods may comprise accessing, by a multifunction control display unit processor, a command database in response to receiving a voice command, identifying, by the processor, a multifunction control display unit multifunction control display unit command in the command database that is associated with the voice command, and transmitting, by the processor, the multifunction control display unit command to a flight management system or other MCDU driven avionics system that is communicatively coupled to the processor for execution by the flight management system or other MCDU driven avionics system.

Furthermore, other desirable features and characteristics of the systems and methods disclosed herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 8A illustrates, in accordance with various embodiments, a table associating a plurality of voice commands with a plurality of MCDU commands;

FIG. 8B illustrates, in accordance with various embodiments, a table associating a plurality of voice commands with a plurality of MCDU commands; and FIG. 8C illustrates, in accordance with various embodiments, a table associating a plurality of voice commands with a plurality of MCDU commands.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
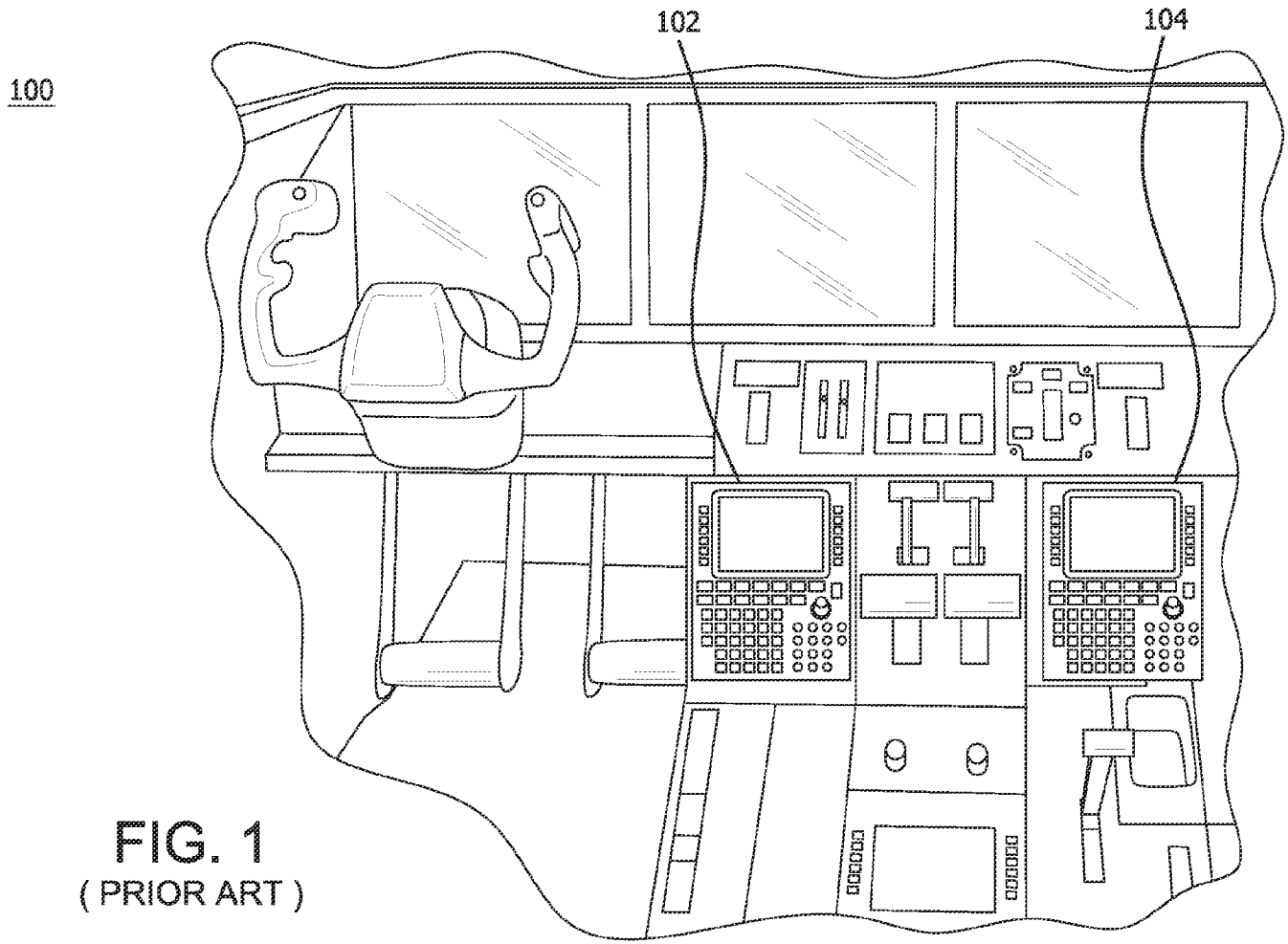
FIG. 1 ( PRIOR ART )
FIG. 1 illustrates an interior perspective view of an aircraft cockpit having two conventional, prior art, keypad controlled MCDUs.

As described above, and with reference to FIG. 1, conventional flight management systems as well as other avionics driven systems 100 can be accessed by way of and controlled by one or more conventional MCDUs 102 and/or 104. Traditionally, a pilot or copilot may manipulate the physical keys comprising an MCDU keypad to navigate to a particular FMS/AS feature or function, such as, for example, an airport identification code, a radio frequency, a flight plan, and the like.

Thus, to reach an FMS/AS feature or function, it may be necessary that a pilot utilize the keypad to navigate through a set of menus and/or submenus using the keypad. In other words, to reach a desired feature or function, a pilot may be required to recall and execute a number of button presses and/or other manual operations using the keypad. This multi-step process may consume time and focus, particularly where the pilot is unfamiliar with the feature and/or function being sought. The difficulty associated with locating the desired feature or function may be magnified during circumstances (e.g., landing) that may give rise to a high or fluctuating workload. Moreover, low resolution MCDU displays may fail to support a variety of non-ASCII characters, rendering many existing MCDU displays unusable to pilots who require non-ASCII characters.

In addition, conventional MCDUs 102 and/or 104 are typically housed within a cabinet or MCDU box. The circuitry comprising these MCDUs 102 and/or 104 is frequently compact and heavy, and any changes to the functionality of a conventional MCDU 102 and/or 104 most often require that the circuitry comprising the MCDU 102 and/or 104 be reconfigured.

A system comprising a touchscreen, voice responsive, MCDU is disclosed. The disclosed MCDU can be mechanically coupled to an outer surface of an existing MCDU cabinet. In addition, the disclosed MCDU can be communicatively coupled to and/or comprise a command database that includes a plurality of MCDU commands. The system can further comprise a pilot voice interface.

A pilot can provide a voice command to the MCDU via the voice interface, and the MCDU can identify, within the command database, an MCDU command that corresponds to the voice command. Thus, in various embodiments, a pilot can be relieved of the necessity of navigating a hierarchy of menus and/or submenus by way of an MCDU keypad. Rather, the MCDU can identify the requested MCDU command in the command database by matching the voice command (with the aid of voice recognition software) with a particular MCDU command. The MCDU can, in addition, transmit this command to the FMS/AS for execution.

However, the disclosed voice responsive MCDU (which can comprise a tablet computing device, such as a touchscreen tablet computing device) can also display a replica of a conventional MCDU keypad, which can employ a menu logic and structure that is identical and/or substantially similar to that of a conventional MCDU—that is, an MCDU with which a pilot has prior experience. Accordingly, although a pilot can provide a voice command to bypass a manual MCDU command selection process, in various embodiments, a pilot can also manipulate a plurality of virtual keys displayed by the MCDU touchscreen display in a manner similar to and/or identical to the manner in which the pilot formerly manipulated the physical keys of a conventional MCDU keypad. Thus, a pilot can choose a command selection option with which the pilot is most comfortable.

The system can further comprise a conversion device capable of being installed within an empty (or emptied out) MCDU cabinet. The conversion device can be, in comparison to existing MCDU circuitry, much lighter in weight and can consume less space within the MCDU cabinet as well.

The conversion device can, in various embodiments, convert an MCDU command (or other MCDU transmitted or received communication) between a universal serial bus ("USB") data standard and an avionics data bus data standard, such as an Aeronautical Radio, Incorporated ("ARINC") 429 data standard. Moreover, in various embodiments, the conversion device can convert an MCDU command (or other MCDU transmitted or received communication) between an avionics data bus standard, such as an ARINC 429 standard and a wireless communication standard (e.g., a WIFI standard, a BLUETOOTH standard, and the like). Thus, the conversion device can format data received from the disclosed MCDU, so that the data can be transmitted on an existing avionics data bus without adaptation of or reconfiguration of the existing data bus. In other words, a conventional MCDU can be easily swapped for the disclosed MCDU and conversion device, and the existing avionics data bus, FMS, and other components communicatively coupled to the MCDU can remain unchanged.

Figure 2:
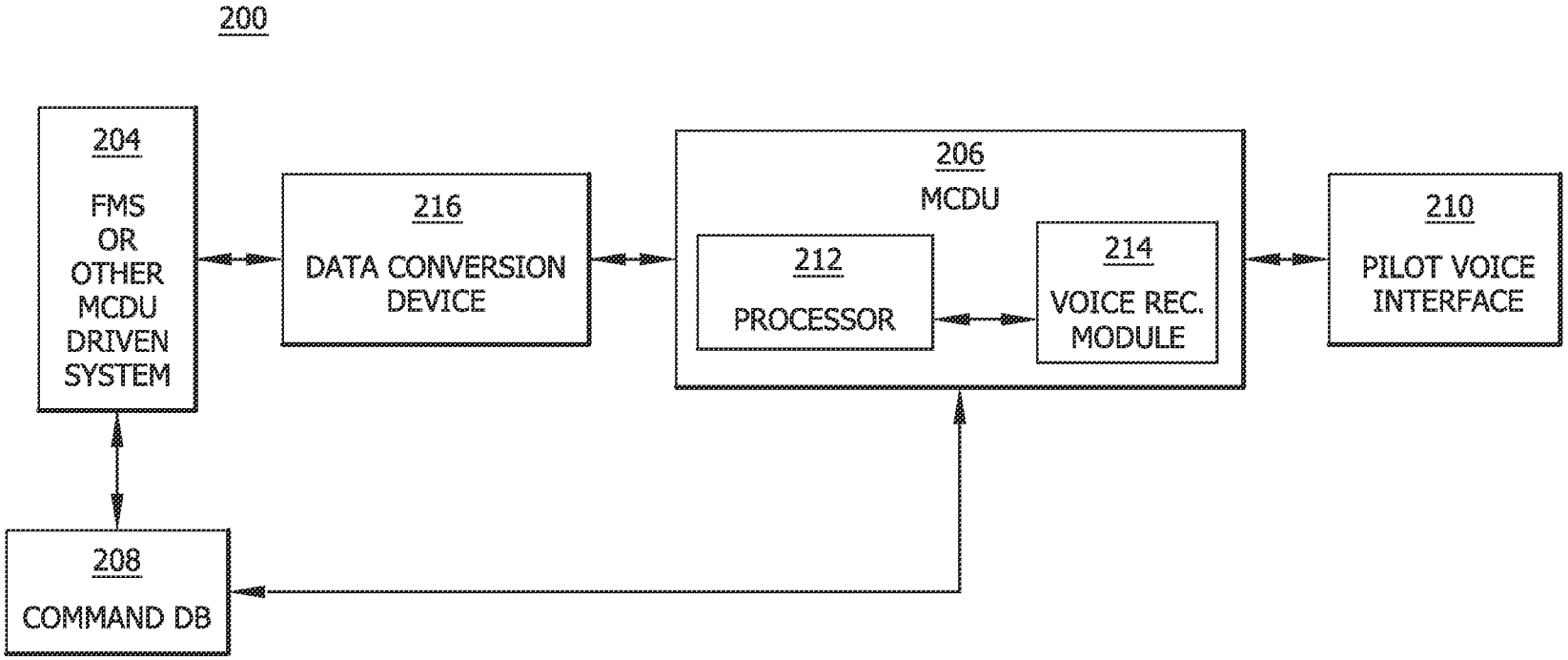
FIG. 2 illustrates, in accordance with various embodiments, a block diagram of a system having a voice responsive, tablet, MCDU.

With reference now to FIG. 2, an aircraft control system 200 is disclosed. The system 200 can include an FMS/AS 204, a voice responsive MCDU 206 (such as a touchscreen and/or tablet computing device), a command database 208, a pilot voice interface 210, and/or a data conversion device 216.

In various embodiments, the FMS/AS 204 can comprise any computer-based system, computer processor, and the like that is capable of and/or configured to receive or transmit an MCDU command (or other data) from or to an MCDU 206 and/or command data from or to the command database 208 and/or converted MCDU command data from or to the data conversion device 216, and, based upon and/or in response to the transmitted or received command(s) and/or command data, manage any of a variety of in-flight and/or ground-based aircraft functionality.

The MCDU 206 can comprise any device capable of and/or configured to communicate an with the FMS/AS 204 (e.g., any device configured to transmit or receive data, such as for example, an MCDU command). More particularly, the MCDU 206 can comprise any device that can receive a voice command or voice command data from a pilot voice interface 210 and/or identify an MCDU command in a command database 208 based upon the received voice command. The MCDU 206 can further comprise any device capable of and/or configured to display a virtual keypad that corresponds, substantially similarly and/or identically, to a conventional MCDU physical keypad. Thus, an MCDU 206 can comprise a tablet computing device, a touchscreen computing device, and/or any combination of these and other similar devices. The MCDU can further include a variety of wireless communications functionality, one or more proximity sensors, one or more accelerometers, and the like.

Thus, in various embodiments, the MCDU 206 can comprise a voice responsive, device, such as, for example, a tablet computing device (which may, again, comprise a touchscreen). The MCDU 206 can comprise a processor (or processors) 212 and/or a voice recognition module 214. The voice recognition module 214 can comprise any hardware, software, and/or tangible, non-transitory computer-readable media capable of execution by the processor 212 to process a voice command received from the pilot voice interface 210. The MCDU 206 is communicatively coupled to the FMS/AS 204 and/or the command database 208 and/or the pilot voice interface 210.

As described briefly above, conventional MCDU 102 and/or 104 displays may lack resolution sufficient to render non-ASCII characters. The MCDU 206 display, however, incorporates a display, such as a tablet display, that is capable of displaying non-ASCII characters. Thus, the MCDU 206 is configured to display a variety of more complex characters and symbols than a conventional MCDU 102 and/or 104 display, thereby enabling the use of the MCDU 206 in a variety of aircraft.

In various embodiments, as described herein, the MCDU 206 is communicatively coupled to the FMS/AS 204 through a data conversion device 216. The data conversion device 216 can comprise any device that enables communication between the MCDU 206 and the FMS/AS 204. For instance, the data conversion device 216 can comprise any device that can convert MCDU commands (as well as other data) from a USB data standard or format to an avionics data bus data standard or format, such as an ARINC 429 data standard or format. The data conversion device can also convert MCDU commands (and other data) from a wireless communications standard to an avionics data bus standard (e.g., again, an ARINC 429 data standard).

The command database 208 can comprise any tangible, non-transitory, memory or computer-readable media capable of and/or configured to store command data, such as, for example, one or more MCDU commands and/or one or more voice and/or textual commands. The command database 208 preferably stores an association or link between one or more MCDU commands and/or one or more voice and/or textual commands. The command database 208 can reside physically apart from the MCDU 206 and/or can comprise a part or component of the MCDU 206.

The pilot voice interface 210 can comprise any device capable of and/or configured to receive and/or transmit pilot voice commands and/or data. For example, the pilot voice interface 210 can comprise a microphone. The pilot voice interface 210 can further comprise a pilot headset that includes a microphone into which the pilot may express a spoken voice command.

Figure 3:
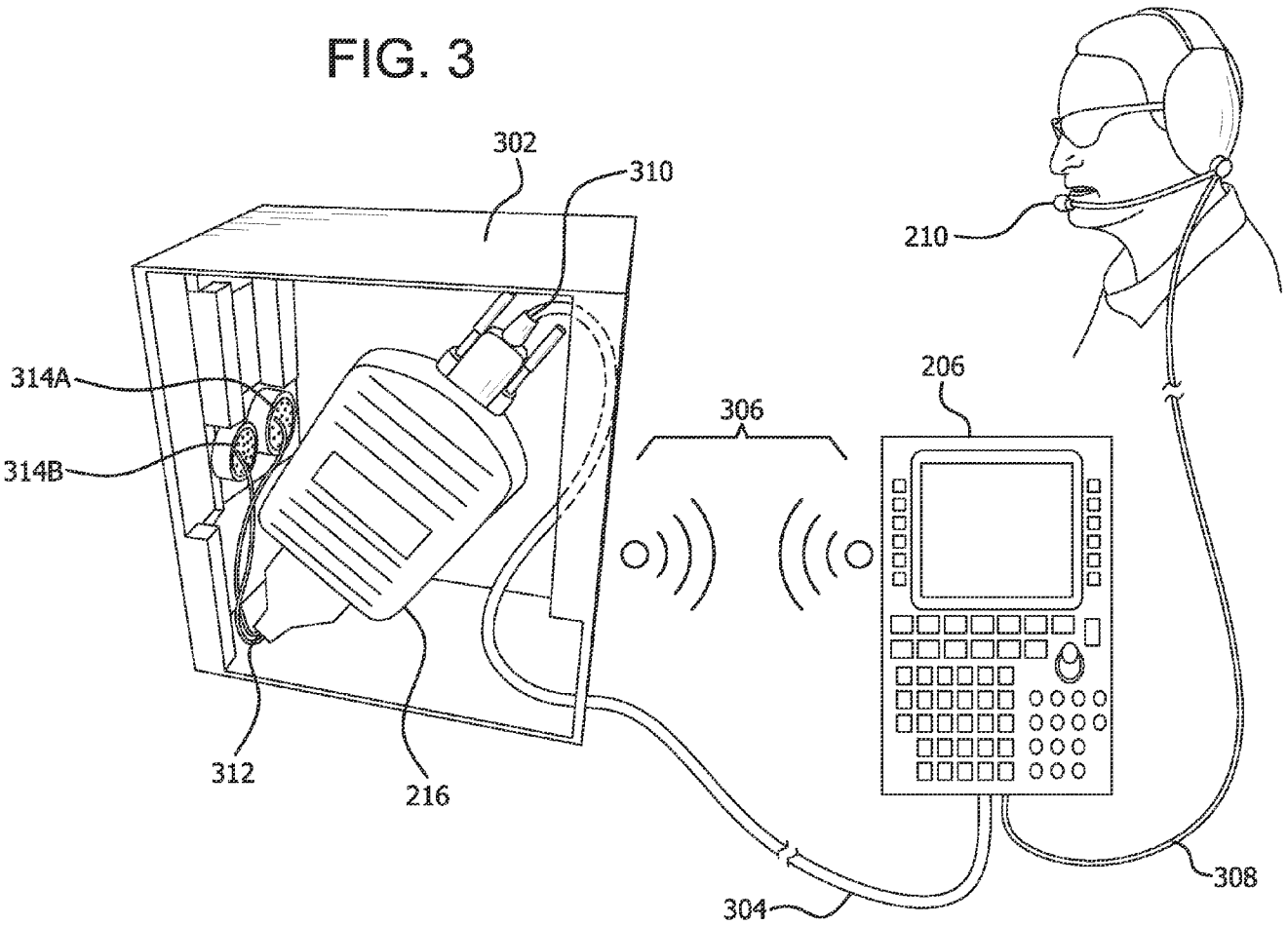
FIG. 3 illustrates, in accordance with various embodiments, a perspective view of a system having a voice responsive, tablet, MCDU.

With respect to FIG. 3, a perspective view of a portion of the aircraft control system 200 is shown. As described herein, the system 200 includes the MCDU 206, which can be communicatively coupled to the data conversion device 216. The MCDU 206 can be communicatively coupled to the data conversion device 216 in any suitable manner. For example, the MCDU 206 can be communicatively coupled to the data conversion device 216 via a wired connection 304, via a wireless connection 306, and the like. The MCDU 206 can be similarly communicatively coupled to the pilot voice interface 210. For instance, the MCDU 206 can be communicatively coupled to the pilot voice interface 210 via a wired connection 308, a wireless connection, and the like.

As described herein, the data conversion device 216 is, in various embodiments, configured to convert MCDU command data that it receives in a USB or wireless data format to an avionics data bus format, such as an ARINC 429 format. Accordingly, as shown, the data conversion device 216 can receive USB or wireless formatted MCDU command data at an input 310, convert the MCDU command data to an avionics data bus data format, and transmit an MCDU command data at its output 312 to one or more existing avionics data bus inputs 314a and/or 314b (each having a variety of pinouts). The MCDU command data may, from here, be communicated over the aircraft avionics communications network to the FMS/AS 204. The data conversion device 216 may further, and in various embodiments, receive data (e.g., from the FMS/AS 204) in an avionics data bus format, convert the data to a USB or wireless format, and transmit the converted data to the MCDU 206.

In addition, as shown, the data conversion device 216 can be retrofitted within a conventional MCDU cabinet 302. More particularly, the hardware and circuitry bundled within a conventional MCDU cabinet 302 can be removed, and the data conversion device 216 inserted within the cabinet. The weight and complexity of the circuitry within the conventional MCDU cabinet 302 can be, in this way, significantly reduced. In addition, as described herein, the introduction of the data conversion device 216 and MCDU 206 to the system 200 may not require modification of the existing avionics data bus and/or any other systems within the aircraft. Rather, the MCDU 206 can be configured, as described, to seamlessly interoperate with existing avionics systems and subsystems.

Figure 4:
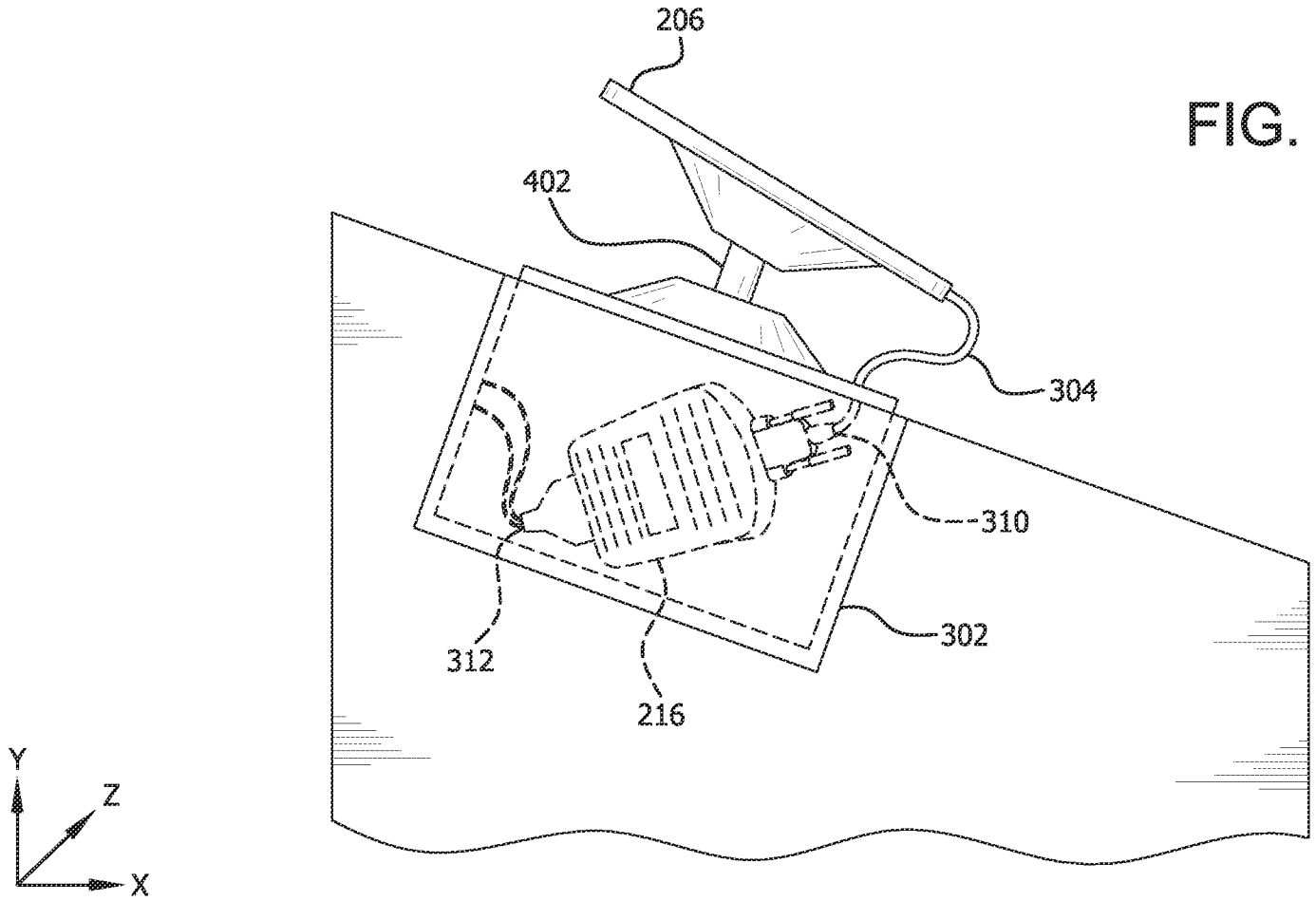
FIG. 4 illustrates, in accordance with various embodiments, a cross-sectional view of a voice responsive, tablet, MCDU extending from a conventional MCDU cabinet.

With attention now to FIG. 4, a cross-sectional view of an MCDU 206 mounted to a conventional MCDU cabinet 302 is shown. The MCDU 206 can be coupled to an outer surface of the conventional MCDU cabinet 302 by any MCDU coupling structure 402 that is configured to, capable of, operable to, or otherwise suitable for the purpose of permitting articulation or motion of the MCDU 206. For example, the MCDU coupling structure 402 can permit the MCDU 206 to move in any direction, such as, for example, in any direction and/or directions in the [z] x, y, and/or z direction or directions. Thus, angle and position of the MCDU 206 can be manipulated by a pilot to achieve an ideal viewing angle, to alter an angle of reflection (e.g., of sunlight) of the MCDU 206 display, and the like.

Figure 5:
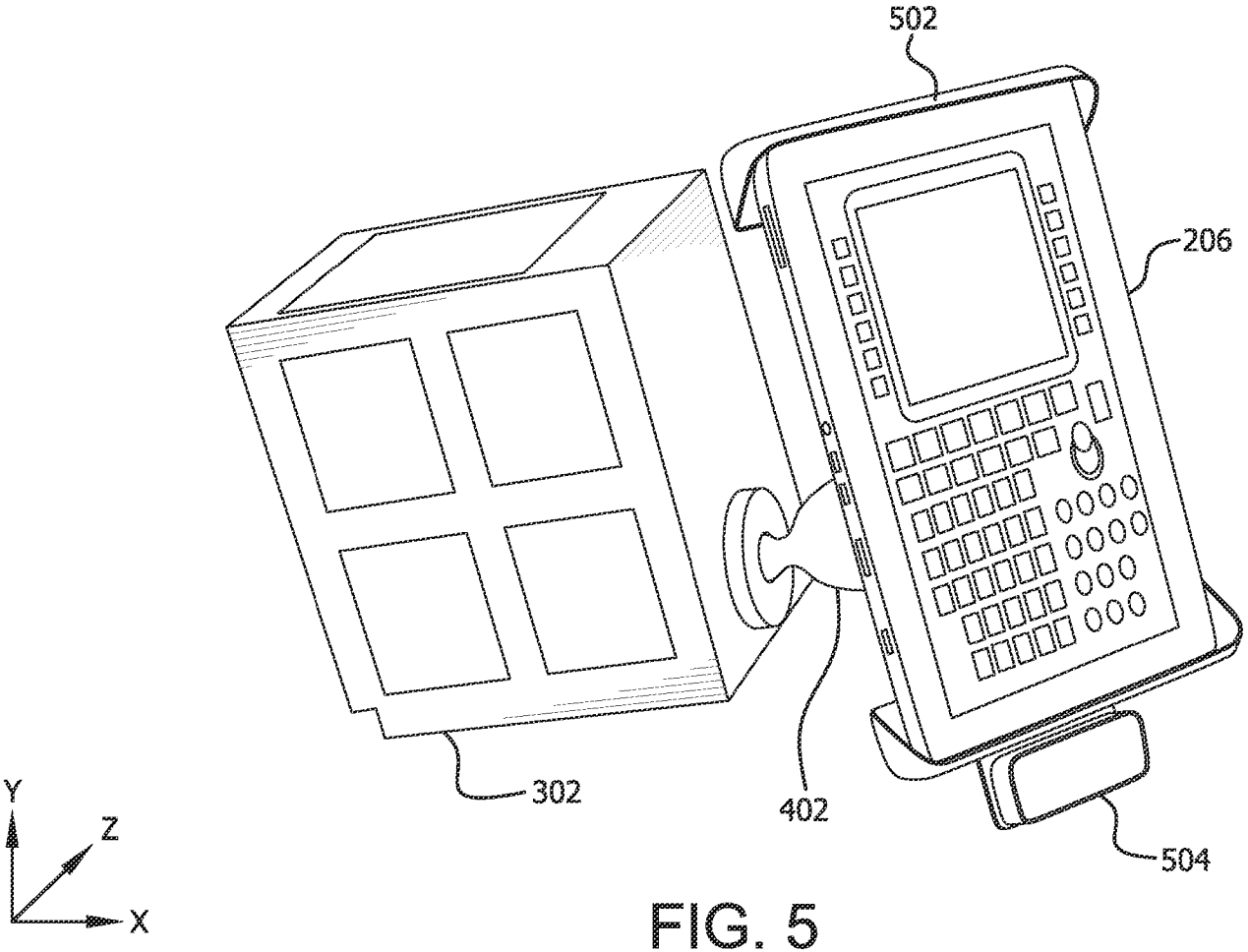
FIG. 5 illustrates, in accordance with various embodiments, a perspective view of a voice responsive, tablet, MCDU extending from a conventional MCDU cabinet.

Turning to FIG. 5, a perspective view of an MCDU 206 removably coupled or mounted to a conventional MCDU cabinet 302 is shown. Here, the MCDU 206 is removably mounted within a holster or case 502, which is mechanically coupled, in turn, to the conventional MCDU cabinet 302. Thus, in various embodiments, a pilot can remove or decouple the MCDU 206 from its holster 502. This permits the pilot to place the MCDU 206 in any location that is convenient to the pilot, such as, for example, in the pilot's lap and/or on the pilot's thigh or knee.

In addition, as shown, a gesture sensitive device 504 can be communicatively coupled to the MCDU 206. The gesture sensitive device 504 can, in various embodiments, communicatively couple to the MCDU 206 through an aperture, opening, or slot formed in the holster 502. The gesture sensitive device 504 can comprise any device capable of or configured to detect a gesture or motion of a pilot, such as a pilot hand wave or other bodily motion. Thus, the gesture sensitive device 504 can comprise, for example, a LEAP MOTION gesture recognition product.

A pilot can, in various embodiments, make a gesture with the body (e.g., a hand) of the pilot, and the gesture sensitive device 504 can detect this gesture and transmit data associated with the gesture (or "gesture data") to the MCDU 206. The MCDU 206 can receive and interpret (e.g., using gesture interpretation software installed in a tangible, non-transitory, memory of the MCDU 206) the gesture data as an instruction by the pilot to execute a particular instruction.

For example, in various embodiments, a pilot can make a throwing gesture, which the gesture sensitive device 504 can receive and transmit, as gesture data, to the MCDU 206 processor 212 can compare this gesture data to a database of predefined stored gesture data, and, if a match is identified between the received gesture data and the stored gesture data, the MCDU 206 processor 212 can execute an instruction associated with the identified stored gesture data, such as, for example, displaying, sharing, moving, translating, or "throwing" an airport moving map or other information from the MCDU 206 display to a larger cockpit display. Moreover, in various embodiments, a gesture such as the pilot can position or hold one or both hands of the pilot to indicate that all cockpit chatter should stop and/or to trigger the voice recognition software installed within the MCDU 206 to begin listening for a pilot voice command.

Figure 6:
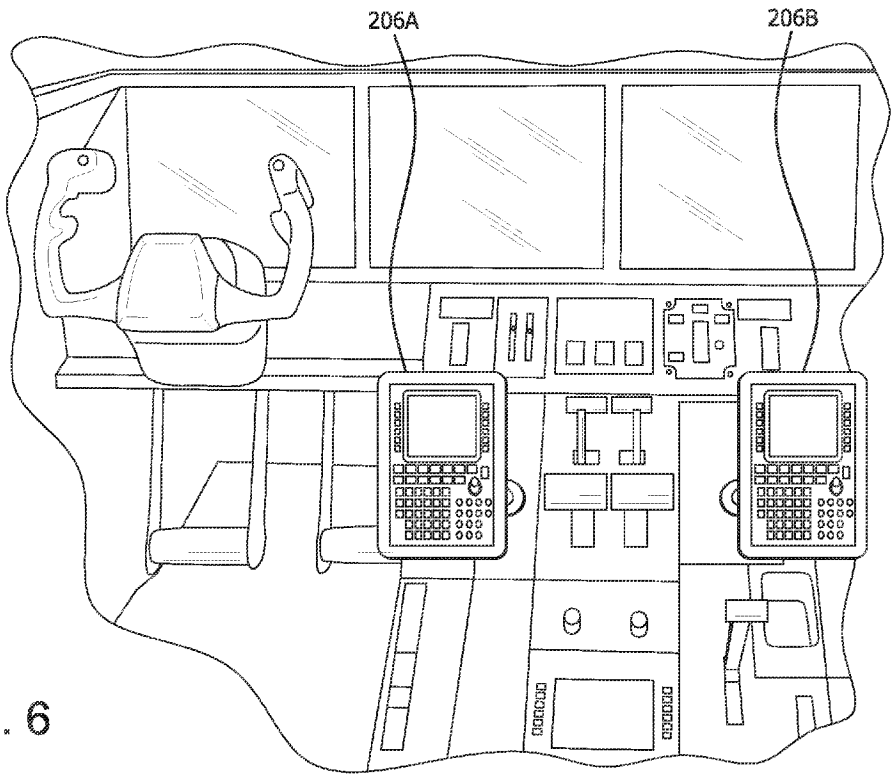
FIG. 6 illustrates, in accordance with various embodiments, interior perspective view of an aircraft cockpit having two voice responsive, tablet, MCDUs.

Thus, with respect to FIG. 6, an aircraft control system 600 comprising two, touchscreen, voice responsive, MCDUs 206a and 206b is shown. One or both of the MCDUs 206a and/or 206b can be touchscreen, voice responsive, MCDUs, as described herein with respect to the MCDU 206. However, in various embodiments, only one of the MCDUs 206a and/or 206b may be a touchscreen, voice responsive, MCDU 206, while the other MCDU can comprise a conventional MCDU, such as the MCDU 102 and/or 104.

Figure 7:
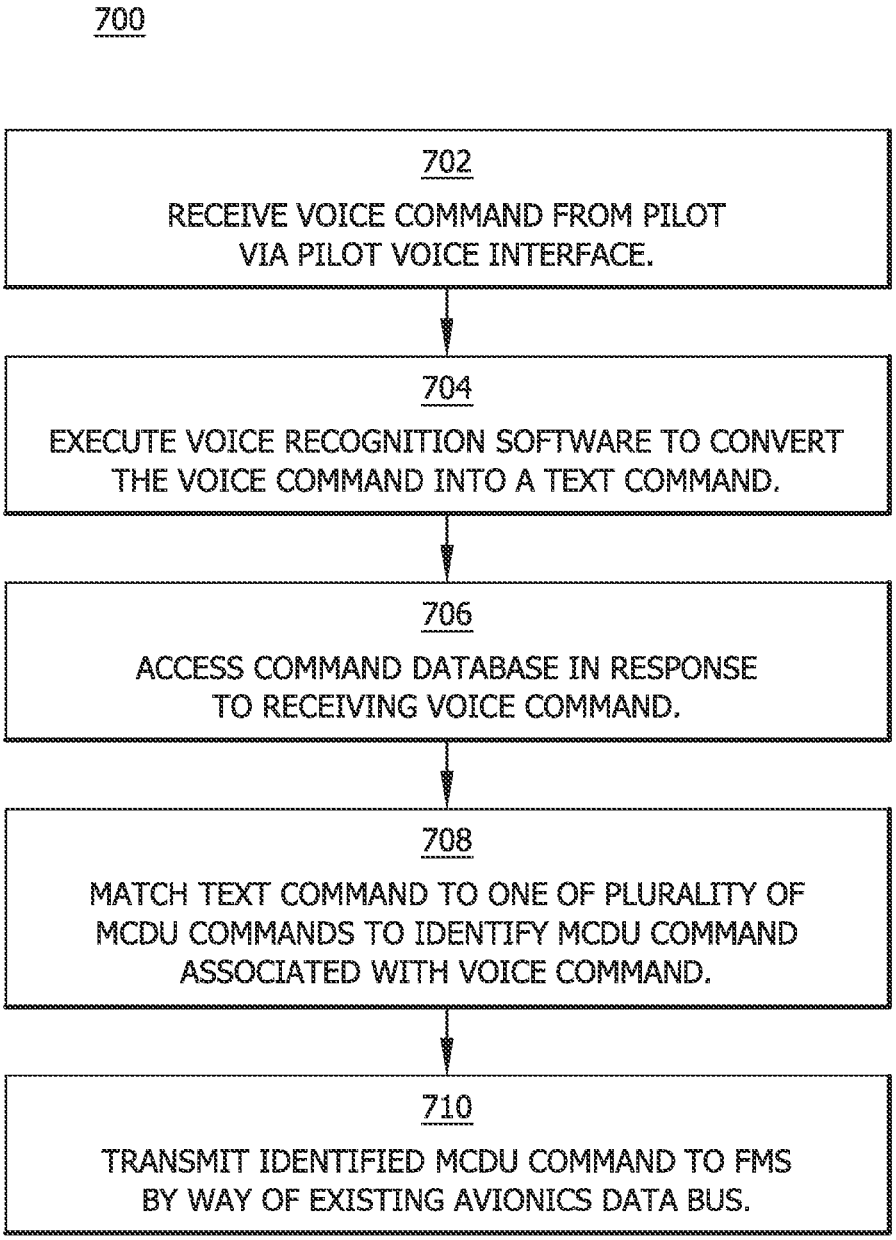
FIG. 7 illustrates, in accordance with various embodiments, a process for selecting an MCDU command based upon a voice command.

With reference to FIG. 7, a process 700 for selecting an MCDU command based upon a voice command is shown. Accordingly, in operation, and as described elsewhere herein, the MCDU 206 receives a voice command from a pilot voice interface 210 (step 702). The MCDU 206 executes voice recognition software to convert the voice command into a text command (step 704). For example, the MCDU 206 processor 212 can read and execute voice recognition software stored in the voice recognition module 214, which can comprise any tangible, non-transitory, computer-readable medium and/or memory. The voice recognition software can be executed by the processor 212 to perform the voice to text conversion described above.

The MCDU 206 further accesses a command database 208 in response to receiving the voice command and/or in response to converting the voice command to a text command (step 706). A command database 208 can include, as shown with reference to FIGS. 8A, 8B, and 8C, a cross-reference table 800. The cross-reference table can comprise any suitable number of columns and/or any suitable number of rows. For example, in various embodiments, the cross-reference table can comprise an MCDU command ("MCDU CMD") column 802 and/or a voice command ("VOICE CMD") column 804.

As described herein, an MCDU command 802 can comprise a command that an MCDU 206 can transmit or communicate to an FMS/AS 204 via an existing avionics data bus. In addition, and as described herein, a voice command 804 can comprise a command that a pilot enters via a pilot voice interface 210. Accordingly, the cross-reference table 800 links an MCDU command 802 to a voice command 804. In various embodiments, and as shown at table 800, the voice command 804 can exist in the table 800 as a text command. Thus, as the MCDU 206 processor 212 interfaces with the MCDU 206 voice recognition module 214 to convert a pilot voice command 804 into a text command, the MCDU 206 can access the command database 208 to match a converted voice/text command 804 stored in the command database 208 to an MCDU command 802 (step 708). The MCDU 206 can therefore identify an MCDU command 802 that is associated with a voice command 804. Having identified the associated MCDU command 802, the MCDU 206 can, in various embodiments, transmit or communicate the identified MCDU command 802 to the FMS/AS 204 via an existing avionics data bus, such as via the existing avionics data bus inputs 314a and/or 314b. The FMS/AS 204 can, in response to receiving the MCDU command, communicate, as described herein, with the MCDU 206 to provide the requested information (that is, the information associated with the MCDU command, such as tower frequency information) to the MCDU 206.

Accordingly, as described above, a pilot can utilize the MCDU 206 (and its associated voice recognition module 214 and processor 212) to bypass a menu hierarchy. In other words, although a pilot can utilize the MCDU 206 touchscreen to navigate through a menu hierarchy to reach a desired MCDU command 802, in various embodiments, the pilot can issue a voice command 804, which, in response to conversion to a text command by the voice recognition module 214 and processor 212, can enable instant (or single-step) navigation to a corresponding MCDU command 802. This can permit a pilot who has difficulty recalling a rarely used MCDU command 802 (and/or the menu navigation process required to reach the MCDU command 802) to reach the MCDU command 802 more rapidly and more easily. This feature can be of particular value to a pilot, for example, during an operation requiring increased focus or increased workload, such as during a landing operation.

Moreover, as shown, for example, with respect to rows 806a and 806b, a particular MCDU command can be associated in the cross-reference table 800, with any number of relatively synonymous voice commands 804. For instance, the MCDU command #1129.25, representing an instruction by a pilot to communicate at a radio frequency of 1129.25

KHz/MHz, can be associated with a variety of synonymous voice commands, such as voice commands 806a ("FREQUENCY ONE TWENTY NINE POINT TWO FIVE") and/or 806b ("FREQUENCY ONE HUNDRED TWENTY NINE POINT TWO FIVE"), both of which result, as shown, in the same MCDU command (i.e., #1129.25). Likewise, in various embodiments, a voice command may comprise a dynamic voice command. For instance, a pilot may not know what at which frequency an air traffic control tower operates. A voice command, such as the voice command, "DWF Tower Frequency" 806C can be included in the Table 8B, and the system 200 can, based upon this voice command (or some variation of the words in this command (e.g., "DWF" and/or "tower" and/or "frequency") search for a tower radio frequency of a nearby tower. Thus, the system 200 can accommodate a variety of voice commands 804, each of which may correspond to, depending upon a pilot's choice of words, a same MCDU command.

In addition, the system 200 can recognize a variety of disparate or separate voice commands, as described above, to determine or make a determination as to what MCDU command a pilot is seeking, notwithstanding that the pilot has not spoken a particular voice command (as shown in Tables 8A-8C) precisely as listed. Again, for example, a pilot may simply speak the word "DWF" or "Frequency," and the system 200 can determine, based upon the closest match to the voice command in the Tables 8A-8C, which MCDU command the pilot is seeking.

A further advantage of system 200 can arise, particularly from a business perspective, in that an MCDU 206 customer can request a variety of customized functionality (e.g., a customized software key or "soft-key"). The soft-key can be associated with any functionality that the MCDU 206 customer requests, such as for example, a particular airport MCDU command code that is frequently used by the MCDU 206 customer.

Software enhancements and/or reconfigurations are easily accomplished with system 200, as opposed to enhancements or reconfigurations of conventional MCDUs 102 and/or 104, because conventional MCDUs 102 and/or 104 may conventionally require actual physical reconstruction or reconfiguration (i.e., time consuming circuit/hardware reconfiguration), while alterations to the MCDU 206 software can be performed relatively quickly in comparison. Moreover, in various embodiments, the cross-reference table 800 can be modified virtually on-the-fly to accommodate any MCDU 206 customer request. Changes of this nature (i.e., changes to the table 800) require very little time and effort to accomplish, because even the MCDU 206 software need not change. The system 200 therefore affords a large number of advantages, as described herein, over conventional flight management systems 100.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system comprising:

a tablet computing device configured to render and implement a multifunction control display unit ("MCDU");

a data conversion device in operable communication with the tablet computing device and configured to convert MCDU commands from a universal serial bus ("USB") standard to an avionics data bus standard;

a gesture sensitive device in operable communication with the tablet computing device and configured to detect hand gestures and transmit gesture data associated with the gesture to the tablet computing device;

an MCDU cabinet having an inner surface and an outer surface, the inner surface defining a cavity having only the data conversion device disposed therein;

a mounting bracket coupled to the outer surface of the MCDU cabinet, the mounting bracket configured to releasably mount the tablet computing device therein, the mounting bracket further configured to be movable, in multiple directions, relative to the MCDU cabinet, to thereby permit movement of the tablet computing device in the multiple directions when the tablet computing device is mounted therein;

a flight management system (FMS) in operable communication with the data conversion device;

a command database, the command database in operable communication with the tablet computing device and storing a plurality of voice commands and a plurality of MCDU commands, each voice command associated with one of the plurality of MCDU commands; and a pilot voice interface configured to receive a voice command from a pilot and transmit the voice command to the tablet computing device, wherein, the tablet computing device is configured to:

interpret the gesture data as an instruction to execute, receive the voice command transmitted by the pilot voice interface, access the command database in response to the voice command to identify an MCDU command in the command database that is associated with the voice command and that is executable by the FMS, at least selectively bypass, in response to the voice command, selection of a plurality of manual MCDU commands, and transmit the MCDU command to the data conversion device for transmission to, and execution by, the FMS.

2. The system of claim 1, the tablet computing device comprising a voice recognition module, the voice recognition module comprising voice recognition software.

3. The system of claim 1, *wherein* the tablet computing device [comprising] *comprises* a processor and a tangible, non-transitory, processor-readable[,] memory[, the memory storing] *that stores* voice recognition software, *wherein* the processor [executing] *is configured to execute* the voice recognition software to convert the voice command into a text command.

4. The system of claim 3, *wherein* the tablet computing device [matching] *is configured to match* the text command to one of the plurality of MCDU commands.

5. The system of claim 1, *wherein* the tablet computing device *is* communicatively coupled to an existing *avionics* data bus[, the tablet computing device transmitting] *and is configured to transmit* the MCDU command by way of the existing avionics data bus.

6. The system of claim 1, wherein the avionics data bus standard is an Aeronautical Radio, Incorporated ("ARINC") 429 standard.

7. The system of claim 1, wherein the tablet computing device [communicates] *is further configured to communicate* with the data conversion device *via* at least one of: [via] a wired connection or [via] a wireless connection.

8. The system of claim 1, further comprising:

a plurality of MCDU driven avionics *systems* in operable communication with the tablet computing device, wherein the tablet computing device is further configured to identify one or more MCDU commands executable by the plurality of MCDU driven avionics *systems* and to selectively transmit the MCDU command to at least one of the plurality of MCDU driven avionics systems for execution thereby.

* * * * *